Figure 1:
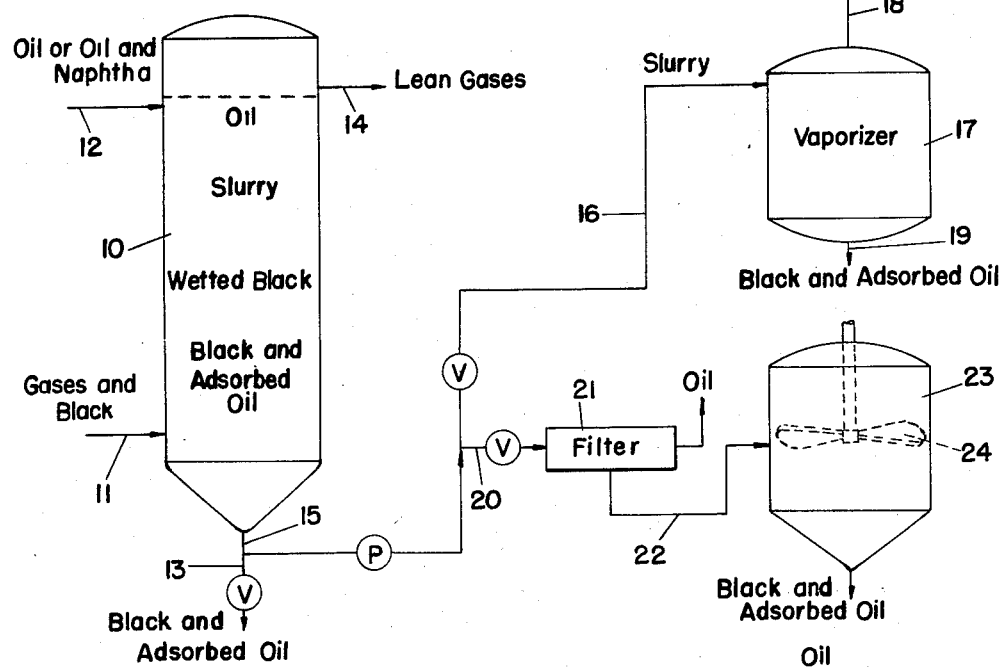

June 28, 1960    M. R. LIPKIN    2,943,064
RECOVERY OF CARBON BLACK
Filed Oct. 17, 1956

INVENTOR.
MOSES R. LIPKIN
BY Roberto Spindle
ATTORNEY

2,943,064

RECOVERY OF CARBON BLACK

Moses Robert Lipkin, Havertown, Pa., assignor to Sun Oil Company, Philadelphia, Pa., a corporation of New Jersey Filed Oct. 17, 1956, Ser. No. 616,451

4 Claims. (Cl. 252—444)

This invention relates to the recovery of carbon black from effluent gases from carbon black production furnaces.

In the production of carbon black, the furnace effluent generally constitutes a dispersion of solid carbon black in finely divided form in combustion gases. It is therefore necessary to provide for separation of the carbon black from the gases. In conventional operation, this separation is accomplished by means of bag filters, electric precipitators, etc. The equipment conventionally used is generally quite expensive and requires a large physical plant. A further disadvantage of the conventional methods is the fact that the carbon black which is obtained is, because of its state of fine subdivision, subject to dusting problems in handling and commercial use.

The present invention provides a novel manner of recovering carbon black from furnace effluent gases, whereby the large physical plant and expensive equipment are, to a large extent at least, eliminated, and the carbon black is obtained in a superior form as compared with the dusting carbon black of the prior art.

It has been proposed previously to form carbon black into pellets by tumbling in rotating cylindrical drums, and spraying the resulting pellets with oil in order to avoid the dusting problem. However, this type of operation is very costly, since the ordinary separation procedure is performed prior to the formation of pellets and spraying with oil. This type of operation is also disadvantageous in that it involves increasing the particle size of the black, whereas the particle size of the black must often be reduced again in subsequent operations, e.g. in rubber compounding. The present invention provides a novel manner of providing nondusting carbon black while eliminating the disadvantageous increasing and decreasing of particle size and, to a large extent at least, the costly conventional separation procedure.

According to one embodiment of the invention, the effluent gases containing carbon black are contacted with a body of liquid petroleum oil, thereby to remove black from the gases and form a mixture of black and oil. As the operation continues, the gases containing black are contacted with the mixture of black and oil to form a mixture containing more black. The contacting can be performed either by passing the gases through the body of material, or by causing the gases to pass over the surface of the body of material and deposit carbon black thereon.

In another embodiment of the invention, the gases containing carbon black are passed upwardly through a contacting zone countercurrent to falling droplets of liquid consisting essentially of oil, produced by suitable spraying means. The falling droplets remove carbon black from the gases and are collected as a body of oil containing carbon black in a lower zone.

In another embodiment of the invention, gases containing carbon black are initially contacted with liquid petroleum oil, whereupon the carbon black is removed from the gases and forms a dispersion in the petroleum oil. Subsequently, liquid is removed from the slurry or dispersion which is formed, thereby to increase the ratio of carbon black to oil and ultimately obtain solid carbon black particles containing adsorbed oil and free of excess oil.

In this embodiment, any suitable contacting procedure can be employed to make the original dispersion of carbon black in oil, e.g. passage of gases through a body of oil, over the surface of a body of oil, or in contact with falling oil droplets. Also, any suitable means can be employed to increase the ratio of carbon black to oil in the resulting dispersion. Thus for example filtration can be employed. Alternatively, a portion of the oil can be vaporized from the dispersion to leave as residue material containing a higher ratio of carbon black to oil. In the latter manner of operation, it is advantageous to employ a mixture of relatively non-volatile petroleum oil and a relatively volatile diluent such as liquid propane, pentane, petroleum naphtha, aviation alkylate, alcohol, acetone, ether, etc., as the collecting agent for the carbon black, the volatile diluent being subsequently vaporized to leave as residue a mixture containing an increased ratio of carbon black to oil; preferably, the amount of diluent in the original collecting agent is within the approximate range from 50 to 90 weight percent of the total liquid collecting agent.

In a preferred embodiment of the invention, the petroleum oil collecting agent which is employed comprises a rubber processing oil. The product obtained in this instance is a mixture of rubber processing oil and carbon black, which mixture is advantageously employed in subsequent compounding of rubber. In many rubber compositions, both petroleum oil and carbon black are desired constituents, and the product obtained according to the invention can be employed to incorporate the desired constituents in the rubber composition. The product obtained in the process according to the invention can be regulated in a manner to provide the desired ratio of carbon black to oil in the rubber composition without addition of carbon black or oil separately. Such separate addition of carbon black or oil is however within the scope of the invention.

Any suitable rubber processing oil derived from petroleum can be employed in this embodiment of the invention. Various rubber processing oils are well known in the art, and typically contain for example 20 to 100 weight percent of compounds containing at least one aromatic ring in the molecule. The viscosity of rubber processing oils is generally within the approximate range from 100 Saybolt Universal seconds at 100° F. to 300 Saybolt Universal seconds at 210° F. Examples of suitable oils are lubricating oil distillates, extracts or raffinates obtained therefrom by solvent extraction with furfural, phenol, etc., polymers from clay treating of cracked gasoline, etc. Various petroleum rubber processing oils are disclosed in an article by W. K. Taft et al., "Industrial and Engineering Chemistry," volume 47, pages 396 to 412 (1954).

The contacting of gases containing carbon black with petroleum oil according to the invention is preferably performed at a temperature above the boiling point of water, since furnace effluent gases normally contain some water; and operation above the boiling point of water minimizes the amount of water which is associated with the product produced according to the invention. Temperatures from 50° F. to 500° F. or higher can be employed. Reduced pressure can be employed to permit relatively low temperatures, e.g. 125° F. to 200° F., to be employed and still avoid retention of water in the collecting agent. In many instances, it is desirable to minimize the amount of water present. However, in some cases, the presence of water is not objectionable and it is unnecessary to take measures to avoid its presence.

Where a diluent other than water is employed, the operation is preferably carried out at a temperature below the boiling point of the diluent. Elevated pressure may be employed to raise the boiling point. Where the diluent boils lower than water, the temperature of the operation is still preferably less than the boiling point of the diluent, even though this usually results in a dispersion which contains water. The water can be removed together with the diluent in a subsequent operation.

In one embodiment of the process according to the invention, an emulsion containing petroleum oil and water is employed as the collecting agent, and water is vaporized from the resulting dispersion in order to obtain as residue petroleum oil in admixture with carbon black. In this embodiment, the emulsion preferably contains 50 to 90 weight percent of water. Alternatively, water-containing mixtures of oil and black obtained according to the invention can be added to rubber latex and the latter coagulated in the presence of the added mixture.

In one embodiment of the invention, a dispersion of carbon black in excess oil is first formed, and the ratio of black to oil then increased until excess oil has been eliminated. The resulting product is carbon black which contains adsorbed oil. The black particles may have associated therewith a wetting layer of oil in addition to oil adsorbed in the pores thereof. Alternatively, they can be free both of excess oil and a wetting layer of oil, in which case the only oil associated with the black is that adsorbed within the pores thereof. Adsorbed oil refers to oil within the pores of the black, wetting oil to any external oil associated with a specific particle, and excess oil to any oil in addition to adsorbed oil and wetting oil.

The capacity of carbon black to adsorb oil generally decreases with increasing temperature. In one embodiment of the invention, a dispersion of carbon black in oil is treated to increase the ratio of black to oil to an extent such that excess oil is removed, but wetting oil is still present, such treatment being performed at a temperature high enough so that the adsorption capacity is relatively low. Upon subsequent cooling, the adsorption capacity increases, and wetting oil becomes adsorbed, thereby eliminating the wetting oil which is undesired in some instances.

Thus, in one embodiment, a dispersion of black in oil is filtered at a temperature within the approximate range from 200° F. to 500° F., and the filter cake is cooled to ambient temperature. The relatively high temperature in the filtration causes the oil to have suitably low viscosity, thereby aiding filtration. The oil filtrate is recycled if desired. Prior to recycling, the oil can be cooled if desired, since it is often advantageous to perform the contacting of gases with oil at relatively low temperatures, e.g. 50° F. to 300° F., more preferably 125° F. to 200° F., since the higher viscosity oil functions more effectively in removing black. The dispersion can be heated to the desired filtration temperature by suitable heating means including heat transfer with the recycle oil.

If desired, the petroleum oil employed as collecting agent in the process according to the invention may contain a dispersion stabilizer to provide a more stable dispersion of carbon black in the collecting agent. This is desirable in some instances, though it is generally preferred to permit the carbon black collected in the petroleum oil to settle to the bottom of a body of the oil and form a more concentrated slurry, which can be separated from the supernatant, more dilute dispersion. Any known stabilizer for dispersions of carbon black in petroleum oil can be employed.

A preferred product prepared by the process according to the invention is solid carbon black containing absorbed petroleum oil, but no excess or wetting petroleum oil. Such products generally contain 5 to 40 weight percent of oil based on oil-free carbon black, more preferably 10 to 30 weight percent. It is within the scope of the invention however to obtain a product which contains wetting oil also, the total oil content being as high for example as 50 weight percent. Products containing larger amounts of oil, e.g. up to equal amounts of black and oil, can also be produced according to the invention. A product which is a dispersion of carbon black in petroleum oil can also be produced, such dispersion containing for example 5 to 50 weight percent of carbon black based on black-free oil, more preferably 10 to 30 weight percent. Products containing larger amounts of black, e.g. up to equal amounts of black and oil, can also be produced. As indicated previously, in one embodiment of the invention, a dispersion of carbon black in petroleum oil is first formed, and then converted into a mixture containing a higher ratio of carbon black to oil.

Dispersions of carbon black in oil, as produced according to the invention, are useful in rubber compounding, and also as greases, luminescent fuels, etc. Solid carbon black containing adsorbed, but not excess, petroleum oil, as produced according to the invention, is useful as an ingredient in rubber compounding and other applications wherein nondusting carbon black is desired. The latter type of product is in many instances preferable to the dispersion type of product in that the dispersion type is often more difficult to handle.

The invention is applicable to carbon blacks generally as produced by processes wherein a dispersion of carbon black in gases is obtained at some stage of formation or subsequent handling of the carbon black.

Figure 2:
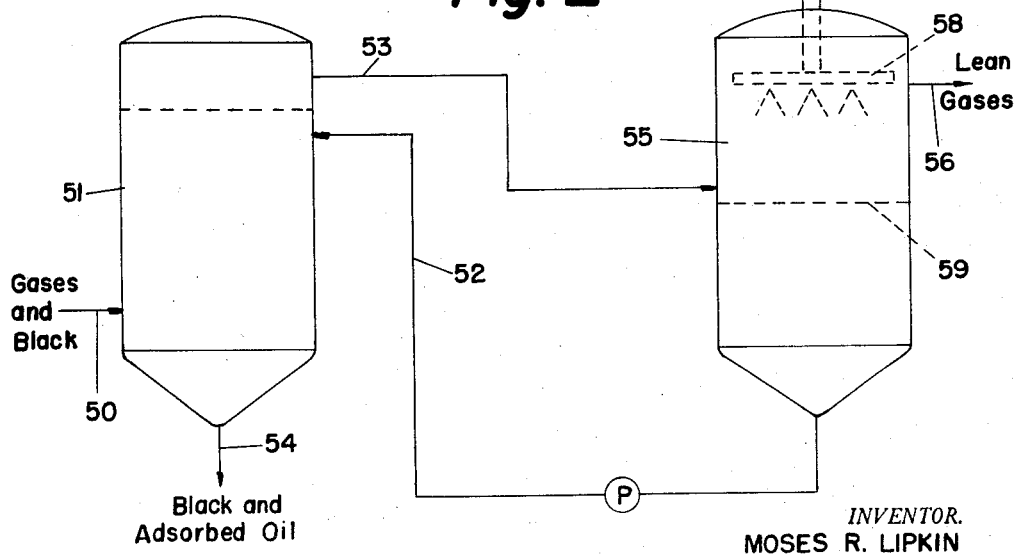

The invention will be further described with reference to the attached drawing, wherein Figure 1 schematically illustrates several embodiments of the invention, i.e. a first embodiment wherein gases containing black are passed upwardly countercurrent to descending oil to obtain as product black containing adsorbed oil, a second embodiment wherein a dispersion of black in oil and diluent is formed and diluent subsequently vaporized therefrom, and a third embodiment wherein a dispersion of black in oil is formed and then filtered at elevated temperature, the retained black being subsequently cooled to increase the amount of oil adsorbed on the black; and Figure 2 illustrates a fourth embodiment wherein gases containing black are contacted with a spray of oil to form a dispersion of black in oil, and gases containing black are passed upwardly through the dispersion.

Referring to Figure 1, furnace effluent gases containing carbon black are introduced through line 11 into vessel 10. Suitable distributing means not shown such as a spider can be employed if desired. In a first embodiment, liquid petroleum oil having Saybolt Universal viscosity at 100° F. of about 500 seconds for example is introduced at about 250° F. for example through line 12 and passes downwardly countercurrent to the rising gases. The dashed line indicates the upper surface of the body of oil-containing material. The oil removes black from the gases to form a dispersion or slurry of black in oil. As the slurry descends, the amount of black therein increases by removal of black from the rising gases until excess oil is no longer present, and a material consisting of black particles wetted with oil is obtained. As the wetted black descends, additional black is picked up from the rising gases. The additional black adsorbs wetting oil from the other particles until black containing adsorbed oil but no excess oil or wetting oil is present. Such black is removed as product through line 13. Lean gases are removed through line 14. If necessary, further means can be employed to remove carbon black from the lean gases. Such means may be conventional filters or electric precipitators, or they may be additional units such as the unit 10. Stirring means not shown can be employed if desired in vessel 10, in order to improve contact of carbon black particles with each other, particularly in the lower portions of the vessel.

The material withdrawn through line 13 contains for example about 30 percent of adsorbed petroleum oil based on oil-free carbon black, and is a highly satisfactory material from the standpoint of nondusting characteristics and general suitability for use in rubber compounding, etc.

In a second embodiment, a mixture of about 70 percent petroleum naphtha and 30 percent liquid petroleum oil is introduced through line 12 into vessel 10. The characteristics of the oil are generally similar to those disclosed previously. The temperature in zone 10 is maintained at about 250° F. by suitable heating means not shown. Furnace effluent gases containing carbon black are introduced through line 11 into a lower portion of vessel 10. The gases pass upwardly through the vessel and carbon black is removed from the gases to form a dispersion of carbon black in the liquid naphtha-oil collecting agent. The gases from which carbon black has been removed are withdrawn through line 14 and can be subjected to further treatment for removal of carbon black if necessary. The ratios of liquid collecting agent and black-containing gases contacted with each other are regulated so that a dispersion of carbon black in liquid collecting agent, rather than solid black containing adsorbed liquid, is withdrawn through line 15. No stirring is provided in vessel 10 in this embodiment, though such stirring is within the scope of the invention. The material withdrawn through line 15 contains for example about 75 parts of carbon black per 100 parts of the mixture of oil and naphtha.

The dispersion is introduced through line 16 into distillation zone 17, wherein substantially all of the naphtha is vaporized and removed through line 18. The residue removed through line 19 is carbon black containing about 40% of adsorbed oil. No excess oil and little or no wetting oil are present, oil which was formerly present in the excess and wetting liquid having entered the pores. Instead of introducing the dispersion directly into zone 18, it may be filtered first by means not shown to remove excess oil and naphtha prior to introduction of the filtered black into zone 17.

In a third embodiment, gases containing carbon black are introduced through line 11 into vessel 10 and are contacted with oil in a manner generally similar to that previously described, no diluent being present, and the temperature being about 250° F. Lean gases are removed through line 14. A dispersion of for example about 30 parts of carbon black in 100 parts of oil is removed through line 20, heated by means not shown and introduced into filter 21, which operates at a temperature of about 400° F. Filter 21 may be of any suitable known construction, e.g. rotary filter, plate and frame, etc. Oil filtrate can be returned through means not shown to vessel 10, preferably after indirect heat exchange with the dispersion in line 20.

The solids held on the filter and removed through line 22 constitute carbon black containing adsorbed and wetting oil but substantially free of excess oil. In vessel 23, the solids are allowed to cool to ambient temperature while being agitated by means of stirrer 24. As the black cools, its adsorption capacity increases, and the wetting oil becomes adsorbed within the particles to produce a black containing for example 30 percent oil, substantially all of which is present as adsorbed oil.

Referring to Figure 2, gases containing carbon black are introduced through line 50 into vessel 51. Therein they are contacted at about 250° F. with a slurry of carbon black in oil introduced through line 52. Carbon black is removed from the gases, and the resulting gases are removed through line 53. In a lower part of vessel 51, carbon black containing adsorbed oil and free of excess oil and wetting oil is collected and removed through line 54. In an upper part of vessel 51, a slurry of black in oil is present, the mixture of black and oil becoming more concentrated in black toward the bottom of vessel 51. In an intermediate portion of vessel 51, carbon black free of excess oil but containing wetting oil is present. As this material descends in vessel 51, it contacts additional dry carbon black which adsorbs wetting oil from the black particles to produce a mixture of particles containing only adsorbed oil. Suitable agitating means not shown are preferably employed in vessel 51.

The gases in line 53 contain carbon black which was not removed in vessel 51, and these gases are introduced into vessel 55 through which they pass upwardly. Liquid petroleum oil similar to that used in vessel 51 and heated to about the same temperature, is introduced through line 57 and spraying means 58. The oil droplets formed by the latter means pass downwardly through vessel 55 countercurrent to the rising gases, and are collected in a body of oil, the upper surface of which is represented by the dashed line 59. The oil droplets remove carbon black from the rising gases, and the gases removed through line 56 contain relatively small amounts of carbon black as compared with the initial furnace effluent. If the extent of removal of carbon black in vessels 51 and 55 is not sufficient in itself, further means can be employed to remove carbon black from the gases in line 56. These means may be conventional filters or electric precipitators, or they may be additional units such as the units 51 and 55.

In place of the spray operation in vessel 55, any other suitable means of forming a dispersion of black in oil can be employed, the resulting dispersion slurry being introduced through line 52 into vessel 51.

Instead of passing gases containing black upwardly through a body of oil, such gases can be passed over the upper surface of a body of oil in order to deposit black from the gases on that surface. The body of oil can be stirred by suitable means to disperse the deposited black throughout the body and produce a dispersion of black in oil, or a body of black containing adsorbed oil.

In the operation illustrated in each of the figures, any entrained collecting agent in the lean gases can be removed by cycloning the gases and recombined with other dispersion of black in collecting agent, e.g. by introduction into vessel 10 at the slurry level, or into line 15 or line 19 or line 52, etc.

The contacting of gases containing carbon black with oil, as practiced according to the invention, is effective to remove a large proportion of the carbon black from the gases. By repeated contacts of the gases with oil, almost any desired extent of removal can be obtained. In those cases where conventional means are employed for black removal subsequent to the operation according to the invention, the disadvantages of the use of conventional means alone are avoided to the extent that the carbon black content of the gases has been previously reduced by the operation according to the invention.

The invention claimed is:

1. Process for recovering carbon black which comprises introducing a stream of effluent gases from carbon black producing furnaces into a countercurrent contacting zone containing a collecting agent consisting of a liquid petroleum oil to produce a dispersion of carbon black in the oil, and removing oil from the dispersion to increase the ratio of carbon black to oil and to obtain a carbon black product containing from 5 to 40 weight percent adsorbed oil and free of excess oil.

2. Process according to claim 1 wherein said removing is performed by filtering the dispersion at a temperature within the approximate range from 250° F. to 500° F.

3. Process according to claim 2 wherein the filtered carbon black is subsequently cooled, whereby wetting oil associated therewith becomes adsorbed in the carbon black.

4. Process for recovering carbon black which comprises introducing a stream of effluent gases from carbon black producing furnaces into a countercurrent contacting zone containing a collecting agent consisting of a solution of a liquid petroleum oil in a volatile diluent to produce a dispersion of carbon black in the solution, and removing diluent from the solution to increase the rtio of carbon black to oil and to obtain a carbon black product containing adsorbed oil and free of excess oil.

References Cited in the file of this patent

UNITED STATES PATENTS

| | | |
|---|---|---|
| 1,245,700 | Geer | Nov. 6, 1917 |
| 1,405,439 | Randall | Feb. 7, 1922 |
| 1,889,429 | Wiegand | Nov. 29, 1932 |
| 2,453,557 | Voet | Nov. 9, 1948 |
| 2,635,057 | Jordan | Apr. 14, 1953 |
| 2,758,039 | Barbour | Mar. 17, 1954 |
| 2,735,828 | Wood | Feb. 21, 1956 |